United States Patent [19]

Stuart

[11] Patent Number: 5,321,762
[45] Date of Patent: Jun. 14, 1994

[54] VOICE COIL ACTUATOR

[75] Inventor: Keith O. Stuart, Cypress, Calif.

[73] Assignee: Aura Systems, Inc., El Segundo, Calif.

[21] Appl. No.: 740,068

[22] Filed: Aug. 5, 1991

[51] Int. Cl.⁵ .............................. H04R 25/00
[52] U.S. Cl. .................... 381/199; 381/194; 381/201
[58] Field of Search ............... 381/192, 193, 194, 199, 381/201, 197, 204; 310/13, 15, 27, 30

[56] References Cited

U.S. PATENT DOCUMENTS

| | | | |
|---|---|---|---|
| 3,319,201 | 5/1967 | Coen | 381/201 |
| 3,549,829 | 12/1970 | Heidrich | 381/166 |
| 3,830,986 | 8/1974 | Yamamuro | 381/197 |
| 4,205,205 | 5/1980 | Babb | 381/197 |
| 4,425,482 | 1/1984 | Bordelon et al. | 381/201 |
| 4,550,229 | 10/1985 | Hwang | 381/194 |
| 4,628,154 | 12/1986 | Kort | 381/199 |
| 4,661,729 | 4/1987 | Hames et al. | 310/13 |
| 4,912,343 | 3/1990 | Stuart . | |

FOREIGN PATENT DOCUMENTS

| | | | |
|---|---|---|---|
| 0083045 | 7/1983 | European Pat. Off. | 381/192 |
| 0128099 | 10/1981 | Japan | 381/199 |
| 0247923 | 10/1988 | Japan | 381/194 |
| 0037811 | 2/1989 | Japan | 381/199 |

Primary Examiner—Curtis Kuntz
Assistant Examiner—Huyen D. Le
Attorney, Agent, or Firm—Anthony T. Cascio; Lisa A. Clifford

[57] ABSTRACT

A voice coil actuator includes a magnetic flux conductive material core, a magnet and an electrical current conductive coil. The core has a first surface and a continuous channel disposed in said first surface. The channel has a pair of opposing walls. The magnet is disposed in intimate contact with a first one of said walls and spaced from a second one of said walls so that a gap remains between the magnet and the second one of the walls. The magnet has a first face of a first magnetic polarity facing the first one of the walls and a second face of a second, opposite magnetic polarity facing the gap. The magnet is further spaced from a bottom of the channel so that magnetic flux is substantially normal from the second face across said gap to the second one of the walls. The electrical current conductive coil is disposed moveably in the gap such that an electrical current in the coil develops a magnetic force on the coil in a direction substantially normal to the magnetic flux to displace said coil in response to said magnetic force.

20 Claims, 2 Drawing Sheets

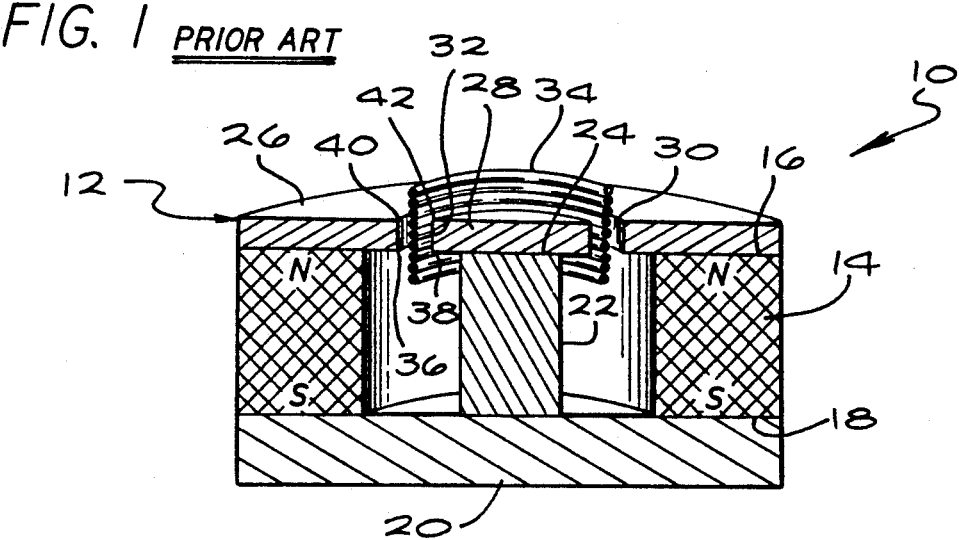
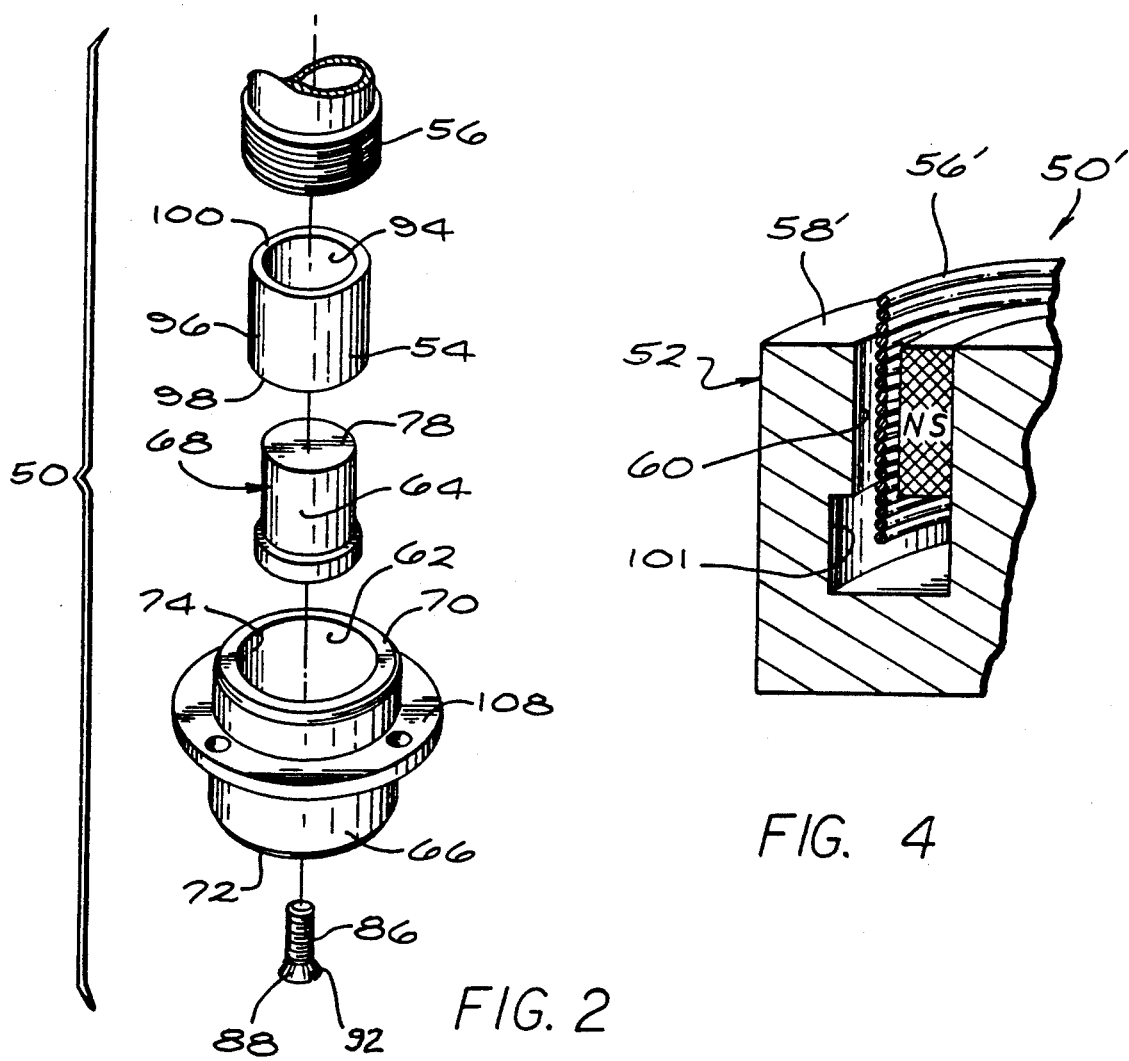

VOICE COIL ACTUATOR

FIELD OF THE INVENTION

The present invention relates generally to electromagnet actuators and more particularly to a novel voice coil actuator and a speaker constructed therefrom.

BACKGROUND OF THE INVENTION

In a typical voice coil actuator, an electrical current conductive coil is suspended at a zero current bias position within a magnetic field formed in a gap. It is highly desirous that the flux path of the field within this gap be optimally radial with respect to the axis of the coil so that when an externally applied current conducts through the coil, the coil will be displaced axially from its zero current bias position in an amount linearly proportional to such current. However, as will be seen from the following discussion, the flux path is, in the known prior art voice coil actuator, is not at an ideal radial orientation with respect to the coil.

In the known prior art voice coil actuator, the magnetic field in the gap is derived from a permanent magnet core. Referring to prior art FIG. 1, there is shown a long coil actuator 10 which is one particular type of prior art voice coil actuator. The construction of its core 12 is based on an axially polarized cylindrical magnet 14 which has a first end face 16 at a first magnetic polarity and a second end face 18 at a second, opposite magnetic polarity. The first end face 16 of the magnet 14 is coaxially mounted on a disk shaped base plate 20 of the core 12. The base plate 20 is formed from magnetic flux conductive material and has a diameter commensurate with the outer diameter of the magnet 14. Mounted on the base plate 20 coaxially within the magnet 14 is a rod 22 of magnetic flux conductive material wherein the rod 22 has a diameter less than the inner diameter of the magnet 14 so that a space therebetween remains. The distal free end 24 of the rod 22 is elevationally commensurate with the second end face 18 of the magnet 14. Completing the core 12 construction, a ring shaped first pole piece 26 and a disk shaped second pole piece 28 are coaxially mounted respectively to the second end face 18 of the magnet 14 and the distal end 24 of the rod 22. Each pole piece 26, 28 is formed from magnet flux conductive material. The first pole piece 26 has an inner diameter less than the inner diameter of the magnet 14 and the second pole piece 28 has a diameter greater than the diameter of the rod 22 with each of these diameters being selected so that a gap remains between the respective facing sides 30,32 of each pole piece 26,28.

A coil 34 is mounted to the above core 12 construction and coaxially suspended within the gap. The overall length of the coil 34 and the height of the gap are selected so that as the coil 34 is moved through its total stroke, defined as the maximum positive and negative axial deviation from its zero current bias position, the number of coil turns within the gap, defining the effective length, L, of the coil 34 remains constant. In the long coil actuator 10, an equal length of the coil 34 extends axially from each end of the gap when the coil 34 is in the zero current bias position as best seen in prior art FIG. 1. The positive and negative stroke limit is then equal to the axially projecting length.

In any prior art voice coil actuator, this condition on the constancy of the coil turns within the gap is necessary to maintain the linearity of the relationship between magnetic force, F, on the coil with respect to current, i, within the coil so that $F \propto i$. Since $F = iL \otimes B$, where B is the magnetic flux density which is assumed to be uniform and radially confined within the gap, it is seen that the force, F, is only dependent on the coil current, i, or $F/i = LB$, with LB being the constant of proportionality, wherein the cross product drops out since the current is assumed to be perpendicular to the uniform radially confined flux. The above statement that the gap height and the effective coil length, L, are identical for the long coil actuator 10 may only be made if the magnet flux density, B, is assumed to be radially confined and uniformly distributed within the gap.

Another type of known prior art voice coil actuators is known as a short coil actuator. In the short coil actuator, the axial length of the coil is less than the height of the gap and, at zero current bias is centered therein. The positive and negative stroke limit is then equal to one-half of the gap height less the coil length so that the coil is always confined within the gap. Based on the above assumption, the effective length, L, of the coil is then equal to its actual length.

Considering only the geometry of the construction of the long and short coil actuator designs, it would appear that the above condition for linearity exist as long as the magnetic flux density within the gap is assumed to be radially confined and uniformly distributed therein. However, it will be shown that in the prior art voice coil actuators, this assumption is not true. It will therefore become apparent that for either the long coil or short coil actuator, the force, F, is a function of each of the current, i, length, L, and flux density, B, or $F = f(i,L,B)$ wherein $\partial F/\partial L$ and $\partial F/\partial B$ are nonzero quantities as the coil moves axially due to magnetic flux leakage at the edges of the gap and nonumiformity of flux density along the length of the gap, as set forth in greater detail hereinbelow. This nonzero dependency of the force, F, on each of the effective coil length, L, and flux density, B, causes a nonlinear response to the coil current, i, and results in harmonic distortion of the coil actuation. This harmonic distortion is one disadvantage and limitation of the prior art voice coil actuator is that the sound produced by the actuation of the voice coil driving a speaker cone is not a pure analog of the coil current. Another disadvantage and limitation is a reduction of efficiency due to leaking magnetic fields not contributing to the flux passing through the coil.

The assumption on the radial confinement and uniform distribution of the flux density within the gap is false for two reasons which although demonstrated in reference to the long coil actuator 10 are also applicable to the short coil actuator. First, since the respective lower 36,38 and upper 40,42 edges of the first and second pole pieces 26,28 present a discontinuity, the flux density fringes outside of the gap from the edges 36,38,40,42 of the pole pieces 26,28 such that the flux is not radially confined within the gap. Secondly, since magnetic flux follows the path of least resistance, the flux density in the gap is therefore greatest at the lower edge 36 of the first pole piece 26 where the first pole piece 26 is adjacent the magnet 14 and decreases toward the upper edge 42 of the second pole piece 28 such the the flux is not uniformly distributed. The nonuniformity of distribution also occurs at the fringing fields at either end of the gap.

In either the long or short coil actuator, the nonuniformity of the flux distribution results in the flux which interacts with the coil to be dependent on the instantaneous position, x, of the coil in the gap as determined at the center of the coil. Since the coil has a finite length within the gap, the current through each loop will be effected by a different value of flux density. The total force, F, acting on the coil will therefore be a summation over the length of the coil of the force developed by the current in each loop of the coil interacting with the flux resulting in the expression $F=\int i(x) \otimes B(x)dx$, where the lower and upper limits of integration are $x-L/2$ and $x+L/2$, respectively. Since the coil is continuous over its length, the current in each loop is identical, or $i(x)=i$ so that the above expression simplifies to $F=i\int B(x)dx$. Therefore, $\partial F=(\int B(x)dx)\partial i+(i\int B(x)dx)\partial B$.

Therefore, it is seen that the change of force, $\partial F$, is not linear with respect to the change of current, $\partial i$, but depends on the coil position, x, within the gap, the length of the coil, L, since these terms are within the limits of integration, and the variation of the flux density, B, over the length of the coil. This nonuniformity is especially prevalent in the short coil actuator since the gap height being much greater than the coil length causes the coil to be exposed to a greater degree of nonuniformity of the flux density along the length of the gap. An additional nonlinearity is introduced in the long coil actuator since the coil at either stroke extreme is removed from a fringing field external of the gap, thereby making the effective coil length, L, also a function of the coil position, x, or $L=L(x)$, which therefore introduces a nonlinear variable into the limits of integration.

In addition to the above described nonlinearities of the known voice coil actuator, a further limitation and disadvantage is the magnetic flux leakage external of the core. For example with reference to prior art FIG. 1, the flux will also fringe from each pole end face 16,18 of the magnet 14 external from the core 12. First, this external fringe results in a waste of useable flux, thereby reducing conversion efficiency of the prior art voice coil actuator. Secondly, this external fringe can also detrimentally interact with nearby electronic circuitry, which often requires the prior art voice coil actuator to be heavily shielded which adds to its size, weight and cost.

SUMMARY OF THE INVENTION

It is therefore an object of the present invention to provide a novel voice coil actuator which minimizes the dependency of actuation force on coil position. It is another object of the present invention to provide a novel voice coil actuator which minimizes flux leakage from the core thereby maximizing efficieny.

According to the present invention, a novel voice coil actuator includes a magnetic flux conductive material core, a magnet and an electrical current conductive coil uniquely arranged. The core has a first surface and a continuous channel disposed in said first surface. The channel has a pair of opposing walls. The magnet is disposed in intimate contact with a first one of said walls and spaced from a second one of said walls so that a gap remains between the magnet and the second one of the walls. The magnet has a first face of a first magnetic polarity facing the first one of the walls and a second face of a second, opposite magnetic polarity facing the gap. The magnet is further spaced from a bottom of the channel so that magnetic flux is substantially normal from the second face across said gap to the second one of the walls. The electrical current conductive coil is disposed moveably in the gap such that an electrical current in the coil develops a magnetic force on the coil in a direction substantially normal to the magnetic flux to displace said coil in response to said magnetic force.

It is a feature of the present invention that one pole of the magnet is adjacent the gap. This construction ensures that the magnetic flux will be uniformly distributed substantially along the length of the gap since the flux emanating from the second face, being a pole, is inherently substantially uniform. This construction also ensures that leakage flux is minimized. Since the flux will follow the path of least resistance, it will prefer to be confined through the core and gap. The minimizing of leakage obviates the need for bulky shielding, simplifying packaging, and allows the novel actuator to be smaller and lighter than existing actuators for the same power output, resulting in further benefits.

These and other objects, advantages and features of the present invention will become readily apparent to those skilled in the art from a study of the following Description of an Exemplary Preferred Embodiment when read in conjunction with the attached Drawing and appended Claims.

BRIEF DESCRIPTION OF THE DRAWING

FIG. 1 (PRIOR ART) is a cross sectional view of a known voice coil actuator of long coil design;

FIG. 2 is an exploded view of a novel voice coil actuator of short coil design constructed according to the principles of the present invention;

FIG. 4 is a fragmentary cross sectional view of a modification to the voice coil actuator of FIG. 2 showing a long coil design.

DESCRIPTION OF AN EXEMPLARY PREFERRED EMBODIMENT

Figure 3:
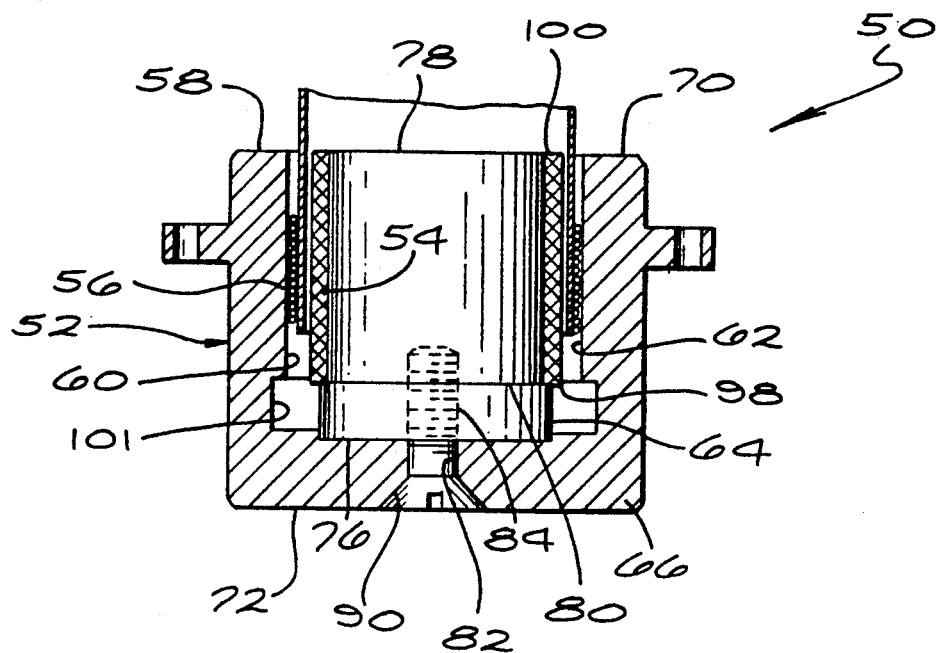
FIG. 3 is a cross sectional view of the voice coil actuator of FIG. 2.

Referring now to FIGS. 2-4, there is shown a novel voice coil actuator 50 constructed according to the principles of the present invention. The actuator 50 includes a core 52, a magnet 54 and an electrical current conductive coil 56. For reasons which will be described in greater detail hereinbelow, a feature of the present invention is that the radially polarized magnet 54 presents a magnetic pole adjacent a gap in which the coil 56 is suspended so that the nonuniformity and fringing of the magnetic field is minimized.

The core 52 is constructed from magnetic flux conductive material and has a first surface 58 and a continuous channel 60 disposed in the first surface 58. The channel 60 has an outer first wall 62 and an inner second opposing wall 64. The core 52 thus described can be machined from a single piece of magnetic flux conductive metal.

In one particular embodiment of the present invention, the core 52 may be assembled from a cylindrical first member 66 and a cylindrical rod 68, each being of magnetic flux conductive material. The first member 66 has a first surface 70 and a second surface 72. The first surface 70 of the first member 66 has a bore 74 which forms the first wall 62 of the channel 60 in the core 52 and a bottom wall 76. The rod 68 is coaxially mounted in the bore 74 to form the inner second wall 64 of the channel 60 and has a first end 78 and a second end 80. The second end 80 of the rod 68 is mounted to the bottom wall 76. The rod 68 has an axial length commensurate with a depth of the bore 74. The first surface 70 of the first member 66 and the first end 78 of the rod 68 together form the surface 58 of the core 52.

To mount the second end 80 of the rod 68 to the bottom wall 76, the second surface 72 of the first member 66 has a coaxial opening 82 therethrough. The second end 80 of the rod 68 has a matching coaxial threaded bore 84. A threaded fastener 86 is received through the opening 82 and engaged in the threaded bore 84. A head 88 of the fastener engages the second surface 72 of the first member 66. The opening 82 may have a frustoconical counterbore 90 and the head 88 may have a matching frustoconical surface 92 so that the head 88 of the fastener 86 is sunk in the second surface 72.

The magnet 54 is disposed in intimate contact with the inner second wall 64 so that a gap remains between the magnet and the outer first wall 62. Alternatively, the magnet 54 could be mounted to the outer first wall 62 and spaced from the inner second wall 64. The magnet 54 is cylindrical in shape and has radial polarization. Accordingly, the magnet 54 has a first face 94 of a first magnetic polarity adjacent the inner second wall 64 and a second face 96 of a second, opposite magnetic polarity facing the gap. The magnet 54 has a lower edge 98 spaced from the bottom wall 76 of the channel 60 and an upper edge 100 coextensive with the first end 78 of the rod 68 so that the magnetic flux is substantially confined normal from the second face 94 of the magnet 54 across the gap to the outer first wall 62. Since the second face 96 is a pole of the magnet 54, the flux emanating from this pole will be continuous and uniform across the entire surface of the second face 96 and be of the same intensity at the lower edge 98 and upper edge 100. The flux in the gap of the novel voice coil actuator 50 is therefore uniform along the height of the gap. This uniformity of flux is a significant advantage of the novel actuator 50 exhibits over the prior art actuator 10.

The magnet 54 may be of unitary cylindrical construction and radially polarized. The magnet 54 may also be constructed from a plurality of arc segments of radially polarized magnetic material. Each arc segment may be bonded directly to the inner wall 64 to form the cylindrical construction. It is also possible to approximate a cylindrical radially polarized magnet by a plurality of flat magnet segments placed side by side on the inner wall 64. The gap remaining between each flat segment would be filled with a flux defocuser, such as iron.

More particularly, the spacing of the lower edge 98 from the bottom wall 76 is selected to be larger than the width of the gap between the magnet 54 and the outer first wall 62. For fringing from the lower edge 98 toward the bottom wall 76 to occur, the fringing field would have an axial component and a radial component. By having the radial component travel a much shorter distance than the axial component, the resistance to the radial component is considerably less than the resistance to the axial component. Since the flux will follow a path of least resistance, these spacings will force the flux to stay radial in the gap and not fringe from the lower edge. Fringing flux may further be minimized by the inclusion of an anti-fringing groove 101 in the outer wall 62. The top of the groove 101 is radially aligned with the lower edge 98 of the magnet 54. Accordingly, the groove 101 increases the length of a fringing field path from the lower edge 98, thereby maintaining the radial confinement of the flux within the gap.

Similarly, fringing flux is also minimized from the upper edge 100 by aligning it coextensive with the first end 78 of the rod 68 and hence in the plane of the first surface 58 of the core 52. Any such fringe would need to travel external of the core and return to the outer first wall 62. Again, this path would be greater than the radial path from the upper edge 100 to the outer wall 62 and have higher magnetic resistance. Furthermore, there is no available path for the flux to leak external of the core 52 which is in direct contrast to the leakage flux between the pole faces 16,18 of the magnet 14 in the prior art voice coil actuator 10. Therefore, the core 52 is inherently self shielding.

The coil 56 is moveably suspended in said gap such that an electrical current in the coil 56 develops a magnetic force on the coil 56 in a direction substantially normal to the radial magnetic flux to displace the coil 56 in response to such magnetic force. Of course, when the coil 56 is coaxially suspended in the gap, the force will be axial and linearly proportional to the current, as is well known. It is known by various means to suspend the coil 56. One particular arrangement will be described hereinbelow.

As best seen in FIG. 3, the length of the coil 56 is less than the height of the gap. Accordingly, the above described actuator 50 is of short coil design. The actuator 50 may also be constructed as a long coil actuator 50' havinbg a coil 56' as best seen in FIG. 4. In either of the short coil actuator 50 or long coil actuator 50', the travel limits of the stroke of the coil are as set forth above with respect to the prior art actuator.

Figure 5:
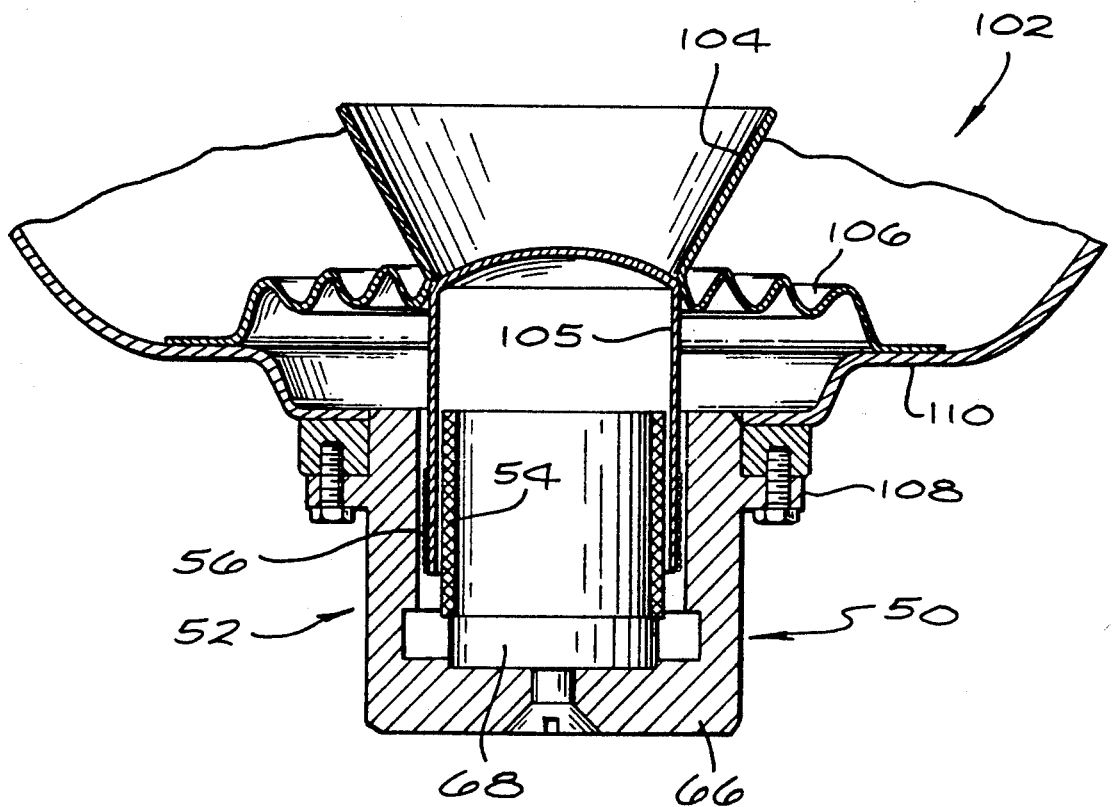
FIG. 5 is a cross sectional view of the actuator of FIG. 2 adapted for use in a speaker.

Referring to FIG. 5, there is shown an application of the novel voice coil actuator 50 in a speaker 102. The speaker includes a speaker cone 104 mechanically connected to the coil 56 through a carrier 105, and a resilient expandable member 106 (known as a spider) attachable to each of the core 52 and the coil 56 to suspend the coil 56 in its zero current bias position. The arrangement of the cone 104 and resilient member 106 are well known. The core 52 may include an annular mounting flange 108 to which a conventional basket 110 may be mounted. The resilient member 106 is conventionally attached to the carrier 105 and the basket 110 as best seen in FIG. 5.

There has been described hereinabove an exemplary preferred embodiment of a novel voice coil actuator. Those skilled in the art may now make numerous uses of and departures from the above described inventive concepts without departing from the inventive concepts disclosed herein. Accordingly, the present invention is to be defined solely by the scope of the following claims.

I claim:

1. A voice coil actuator comprising:
 a magnetic flux conductive material core having a first surface and a continuous channel disposed in said first surface, said channel having a first wall and a second opposing wall, said second wall including an anti-fringing groove,
 a cylindrical magnet disposed in intimate contact with said first wall and spaced from said second wall, so that a gap remains between said magnet and said second wall, said magnet having a first face of a first magnetic polarity facing said first wall and a second face of a second, opposite magnetic polarity facing said gap, said magnet further being spaced from a bottom of said channel so that magnetic flux is substantially normal from said second face across said gap to said second wall; and an electrical current conductive coil moveably suspended in said gap such that an electrical current in said coil develops a magnetic force on said coil in a direction substantially normal to said magnetic flux to displace said coil in response to said magnetic force, said coil having a length less than a height of said gap such that said coil remains fully within said gap when displaced within the range of the total stroke of said coil.

2. A voice coil actuator as set forth in claim 1 wherein current in said coil is substantially parallel to the plane of said first surface.

3. A voice coil actuator as set forth in claim 1 wherein said core is cylindrically shaped and said channel is coaxial within said core.

4. A voice coil actuator as set forth in claim 1 wherein said magnet has an upper edge in a plane of said first surface.

5. A voice coil actuator as set forth in claim 1 wherein said anti-fringing groove has a top aligned opposite a lower edge of said magnet.

6. A voice coil actuator in accordance with claim 1 wherein a height from the lower edge of said magnet to the bottom of the channel is greater than a width between the magnet and the second wall.

7. A voice coil actuator comprising:
a cylindrically shaped, magnetic flux conductive material core having a first surface and an annular channel coaxially disposed in said first surface, said channel having an inner wall, an outer wall and a bottom wall, said outer wall having an anti-fringing groove;

a cylindrical radially polarized magnet mounted in intimate contact to said inner wall and spaced from said outer wall such that a gap remains between said magnet and said outer wall, said magnet having an upper edge in a plane of said first surface and a lower edge spaced from said bottom wall such that magnetic flux is substantially radially confined within said gap; and an electrical current conductive coil moveably suspended coaxially within said gap such that an electrical current in said coil develops an axial magnetic force on said coil linearly proportional to said current, said coil having a length less than a height of said gap such that said coil remains fully within said gap when displaced within the range of the total stroke of said coil.

8. A voice coil actuator as set forth in claim 6 wherein said anti-fringing groove has a top, said top being radially opposite said lower edge of said magnet.

9. A voice coil actuator in accordance with claim 7 wherein a height from the lower edge of said magnet to the bottom of the channel is greater than a width between the magnet and the outer wall.

10. A voice coil actuator comprising:
a cylindrical magnetic flux conductive material first member having a first surface and a second surface, said first surface having a bore therein to form a first cylindrical wall and a bottom wall;

a magnet flux conductive rod disposed coaxially in said bore to form a second cylindrical wall spaced from said first wall and having a first end and a second end, said second end being mounted to said bottom wall, said rod having an axial length commensurate with a depth of said bore, said first wall including an anti-fringing groove;

a cylindrical radially polarized magnet mounted in intimate contact to said second wall and spaced from said first wall such that a gap remains between said magnet and said first wall, said magnet having an upper edge coextensive with said first end of said rod and a lower edge spaced from said bottom wall such that magnetic flux is substantially radially confined within said gap; and an electrical current conductive coil moveably suspended coaxially within said gap such that an electrical current in said coil develops an axial magnetic force on said coil linearly proportional to said current.

11. A voice coil actuator as set forth in claim 10 wherein said second surface has a coaxial opening therethrough and said first end of said rod has a coaxial matching threaded bore, said voice coil actuator further including a threaded fastener received through said opening and engaged with said threaded bore, said threaded fastener having a head engaging said second surface.

12. A voice coil actuator as set forth in claim 11 wherein said opening in said second surface has a counter bore, said head being disposed in said counter bore.

13. A voice coil actuator as set forth in claim 12 wherein said counter bore is frustoconical and said head has a matching frustoconical surface.

14. A speaker comprising:
a cylindrically shaped, magnetic flux conductive material core having a first surface and an annular channel coaxially disposed in said first surface, said channel having an inner wall, an outer wall and a bottom wall, said outer wall including an anti-fringing groove;

a cylindrical radially polarized magnet mounted in intimate contact to said inner wall and spaced from said outer wall such that a gap remains between said magnet and said outer wall, said magnet having an upper edge in a plane of said first surface and a lower edge spaced from said bottom wall such that magnetic flux is substantially radially confined within said gap;

an electrical current conductive coil moveably suspended coaxially within said gap such that an electrical current in said coil develops an axial magnetic force on said coil linearly proportional to said current;

a speaker cone driven by said coil; and a resilient expandable member attached to said first surface and said coil to suspend said coil in said gap and to bias said coil in a zero current bias position.

15. A speaker as set forth in claim 14 wherein said coil has an axial length less than a height of said gap such that said coil is disposed fully in said gap in the range of a total stroke of said coil.

16. A speaker comprising:
a cylindrical magnetic flux conductive material first member having a first surface and a second surface, said first surface having a coaxial bore therein to form a first cylindrical wall and a bottom wall, said first wall having an anti-fringing groove;

a magnet flux conductive rod disposed coaxially in said bore to form a second cylindrical wall spaced from said first wall and having a first end and a second end, said second end being mounted to said bottom wall, said rod having an axial length commensurate with a depth of said bore;

a cylindrical radially polarized magnet mounted in intimate contact to said second wall and spaced from said first wall such that a gap remains between said magnet and said first wall, said magnet having an upper edge coextensive with said first end of said rod and a lower edge spaced from said bottom wall such that magnetic flux is substantially radially confined within said gap;

an electrical current conductive coil moveably suspended coaxially within said gap such that an electrical current in said coil develops an axial magnetic force on said coil linearly proportional to said current;

a speaker cone driven by said coil; and a resilent expandable member attached to said first surface and said coil to suspend said coil in said gap and to bias said coil in a zero current bias position.

17. A speaker as set forth in claim 16 wherein said coil has an axial length less than a height of said gap such that said coil is disposed fully in said gap in the range of a total stroke of said coil.

18. A speaker as set forth in claim 16 wherein said second surface has a coaxial opening therethrough and said first end of said rod has a coaxial matching threaded bore, said voice coil actuator further including a threaded fastener received through said opening and engaged with said threaded bore, said threaded fastener having a head engaging said second surface.

19. A speaker as set forth in claim 18 wherein said opening in said second surface has a counter bore, said head being disposed in said counter bore.

20. A speaker as set forth in claim 19 wherein said counter bore is frustoconical and said head has a matching frustoconical surface.

* * * * *